United States Patent
Fernandez et al.

(10) Patent No.: US 7,514,655 B2
(45) Date of Patent: Apr. 7, 2009

(54) TILTABLE PANNINI GRILL

(75) Inventors: Juan Fernandez, Towaco, NJ (US); Paul Mc Grath, Towaco, NJ (US); Raymond Hoi Tak Lam, Wanchai (HK)

(73) Assignees: Products of Tomorrow, Inc., Montville, NJ (US); South Asia International, Hong Kong (CN)

( * ) Notice: Subject to any disclaimer, the term of this patent is extended or adjusted under 35 U.S.C. 154(b) by 0 days.

(21) Appl. No.: 11/471,089

(22) Filed: Jun. 20, 2006

(65) Prior Publication Data

US 2006/0213373 A1 Sep. 28, 2006

Related U.S. Application Data

(60) Provisional application No. 60/779,944, filed on Mar. 7, 2006.

(51) Int. Cl.
*H05B 3/06* (2006.01)
*A47J 37/06* (2006.01)

(52) U.S. Cl. .............. 219/524; 219/525; 219/386; 99/372; 99/373; 99/376; 99/377; 99/378; 99/380; 99/349

(58) Field of Classification Search ............. 219/524–5, 219/386; 99/372–3, 376–8, 380, 349
See application file for complete search history.

(56) References Cited

U.S. PATENT DOCUMENTS

| 1,332,935 | A | 3/1920 | Thomas |
| 1,385,829 | A | 7/1921 | Holbrook |
| 1,437,122 | A | 11/1922 | Wells |
| 1,505,681 | A | 8/1924 | Warner |
| 1,526,123 | A | 2/1925 | Du Charme |
| 1,729,662 | A | 10/1929 | Guest |
| 1,769,045 | A | 7/1930 | Strite |
| 1,802,005 | A | 4/1931 | Detwiler |
| 2,197,056 | A | 4/1940 | Nelson |
| 2,899,888 | A | 8/1959 | Koci |
| 3,852,569 | A | 12/1974 | Potvin |
| 3,963,898 | A | 6/1976 | Tuckwell |
| 4,195,560 | A | 4/1980 | DuBois |
| 4,206,345 | A | * 6/1980 | Maass et al. ................. 219/524 |
| 4,386,557 | A | 6/1983 | Meraj |
| 5,363,748 | A | 11/1994 | Boehm et al. |
| 5,716,657 | A | 2/1998 | Liebermann |
| 5,802,958 | A | 9/1998 | Hermansson |
| 5,845,562 | A | 12/1998 | Deni et al. |
| 5,847,365 | A | 12/1998 | Harter et al. |
| 5,927,184 | A | 7/1999 | Hermansson |
| 5,934,182 | A | 8/1999 | Harter et al. |

(Continued)

*Primary Examiner*—Shawntina Fuqua
(74) *Attorney, Agent, or Firm*—Lerner, David, Littenberg, Krumholz & Mentlik, LLP (57) ABSTRACT

An electric grill for use to create healthier meals is disclosed. The electric grill comprises a support structure which holds a top heating section and a bottom heating section connected by a hinge. The hinge allows for a wide range of movement whereby the top heating section may be face to face with the bottom heating section, may be perpendicular, or may be at a 180 degree angle. Moreover, the top and bottom heating sections may be tilted such that excess grease, oils and juices may be separated from the food being cooked. The electric grill disclosed herein also may include a digital read-out display and a user input keypad.

32 Claims, 4 Drawing Sheets

U.S. PATENT DOCUMENTS

| | | |
|---|---|---|
| 6,012,380 A | 1/2000 | Hermansson |
| 6,016,741 A | 1/2000 | Tsai et al. |
| 6,079,321 A | 6/2000 | Harter et al. |
| 6,369,366 B1 | 4/2002 | Mullen |
| 6,429,409 B1 | 8/2002 | Siu |
| 6,555,795 B2 | 4/2003 | Glucksman et al. |
| 6,820,537 B2 | 11/2004 | Patenotre |
| 7,109,442 B2 * | 9/2006 | Steinberg et al. ............ 219/386 |
| 7,180,034 B1 * | 2/2007 | Oppenheimer .............. 219/386 |
| 2002/0153366 A1 | 10/2002 | Glucksman et al. |
| 2003/0051605 A1 | 3/2003 | Frantz et al. |
| 2004/0020371 A1 | 2/2004 | Patenotre et al. |
| 2004/0050256 A1 | 3/2004 | Patenotre |
| 2004/0182252 A1 | 9/2004 | Brady et al. |
| 2005/0000957 A1 | 1/2005 | Jones et al. |
| 2005/0139086 A1 | 6/2005 | McHutchison |
| 2005/0247210 A1 | 11/2005 | Ragan |
| 2006/0049164 A1 | 3/2006 | Bryan |
| 2006/0049169 A1 | 3/2006 | Li |

* cited by examiner

TILTABLE PANNINI GRILL

CROSS REFERENCE

This present application claims the benefit of U.S. Provisional Patent Application 60/779,944, titled TILTABLE PANNINI GRILL, filed on Mar. 7, 2006. The disclosure of said application is hereby incorporated herein by reference.

BACKGROUND OF THE INVENTION

The present invention relates to electric grills which are commonly used to create more healthy meals. Grills of this type commonly separate excess oils and juices from the food being prepared, such that the cooked food has a lower fat and cholesterol content.

Many such grills are well known in the art. These grills typically include a bottom heating surface and an upper heating surface which, when an electric current is introduced, become hot enough to cook various types of food. The top and bottom heating surfaces are commonly connected using a hinge. The food usually rests on the bottom heating surface while the top heating surface, facing the bottom heating surface, is placed on top of the food. The food is thereby cooked on both sides simultaneously, which cuts down on cooking time.

However, an all too common problem occurs when cooking larger food because the top heating surface cannot remain parallel to the bottom heating surface. As a result, the food is cooked unevenly because it is being pinched on one side by the misaligned top heating surface. The grills that attempt to resolve this require the use of springs, or other extraneous techniques and mechanisms, to create a cumbersome and complicated cooking system. Moreover, these past solutions limit movement of the top cooking surface, and thus still create problems when cooking larger food. Additionally, these techniques and systems further limit the various methods of cooking possible on the electric grill.

Other types of electric grills allow for the bottom heating surfaces to be configured on an angle. An angled bottom heating surface allows excess grease, oils and juices to separate from the food being prepared, thus creating a healthier meal. The bottom heating surface, as well as the top heating surface, is usually fixed at a pre-determined angle, or may be limited to adjustment between only two or three pre-specified angles. The constraint on the possible cooking angles severely limits the use of the electric grill.

Most, if not all, of the electric grills are designed such that the top heating surface is attached to the bottom heating surface using a hinge. Thus, the top heating surface can be raised or rotated to be perpendicular to the bottom heating surface. This feature allows the user to easily position the food on the bottom heating surface without interference from the upper surface. In effect, the top heating surface acts only as a secondary cooking surface. Therefore, if the user desires to cook only one side of the food, the top heating surface may remain in its perpendicular position and left unused.

Commonly, when the top heating surface is left in the perpendicular position, the top heating surface is still using electricity and is still creating heat. There is no way to regulate the temperature of the top and bottom heating surfaces individually. This not only wastes energy, but creates a burn risk to a user preparing food product with the grill.

Other electric grills comprise a manual controller such as a cooking timer. The cooking timer usually incorporates a large manual dial or knob which the user can manually set. After a predetermined period of time set by the user, the controller may turn the grill off such that no current is passed through the cooking surfaces, allowing the surfaces to cool.

Despite the electric grills currently in use, there remains a need for a simple and efficient electric grill with improved features.

SUMMARY OF THE INVENTION

In accordance with one aspect of the invention, an electric grill comprising a support structure having top and bottom heating sections is disclosed. The top heating section has a top cooking surface and the bottom heating section has a bottom cooking surface. The top and bottom heating sections are connected to the support structure and at least one section is pivotally associated with the support structure to move between a closed position at which the cooking surfaces are facing one another and an open position at which the surfaces are at an angle to one another that is equal to or greater than 90 degrees. In a closed position, the top heating section is preferably directly on top of and facing the bottom heating section, which lowers the required cooking time by cooking the food on two sides. Moreover, the top heating section may be in an open position such that the top heating section is perpendicular to the bottom heating section. This open position allows the user to easily place food on the bottom cooking surface, and can also be used to cook food only on one side. The top heating section may be opened to 180 degrees such that the top and bottom heating sections can both be used as a flat cooking surface on which food may be placed. The support structure preferably includes a tilting mechanism which supports the top and bottom heating sections in a plurality of angular positions.

The top and bottom heating sections may be maintained separate from one another, while in the closed position, at a distance such that food on the bottom cooking surface is not touched by the top cooking surface, or the top heating section may be lowered towards the bottom heating section so that food on the bottom cooking surface is touched by the top cooking surface.

An additional aspect of this invention may include an at least one hinge to which the top and bottom heating sections are connected and which allows the aforementioned pivoting. The hinge is preferably of the type that can float to accommodate various sizes of food. This allows the top heating section to always be in contact with the food by maintaining a parallel position as compared to the bottom heating section, when in the closed position. An electric grill that can maintain the top heating section parallel to the bottom heating section cooks the food more evenly over the entire surface of the food.

The top and bottom heating sections are more preferably hinged together by two hinges separated from one another which allow for grease, oils and juices from the food being cooked to drip off of the bottom heating section from between the two hinges. The hinges and tilting mechanism preferably attach to the top and bottom heating sections at the same point on both the top and bottom heating sections.

In a preferred embodiment, two tabs may be engaged to hold the top heating section in a position as high above the bottom heating section as possible. This setting, once the tabs are engaged, may create a broil-type cooking arrangement.

The tilting mechanism, in a preferred embodiment, comprises a gear allowing releasable fixation of the top and bottom heating sections at a number of discrete angular positions. The tilting mechanism is more preferably a gear-toothed wheel in conjunction with a rod which fits within two teeth of the gear-toothed wheel. When the rod engages the wheel the top and bottom heating surfaces are locked in place and when the rod is disengaged the combination of the top and bottom heating surfaces can move freely. The rod preferably engages and disengages the wheel by a user-operated push button. The series of gear teeth are preferably spaced to allow for fine adjustment, ie five degree increments. However, it is also anticipated that the tilting mechanism may allow for infinitely adjustable releasable fixation of the top and bottom heating sections. Holding handles located on the front of both the top and bottom heating sections, the button may be pushed by the user which removes the rod from the gear wheel. The heating sections, as a single unit, are then adjusted, by manually moving the top and bottom heating sections using the handles, to the desired angle and the button is released. Upon release of the button, the rod re-engages the gear wheel at the desired angle and locks the heating sections at the desired angle. The angular positioning can preferably adjust the top and bottom heating sections to an angle from 0 to 60 degrees.

A further aspect of the invention is a variety of cooking surfaces which attach to the top and bottom heating sections to enable the electric grill to operate in a variety of cooking uses. The cooking surfaces are removable, replaceable and washable. The top cooking surface may be the same as the bottom cooking surface. The top cooking surface may also be different from the bottom cooking surface, which is particularly useful when the electric grill is arranged such that the top heating section is at a 180-degree angle to the bottom heating section, thus creating two flat surfaces on which different types of cooking may occur at once. The variety of cooking surfaces includes, but is not limited to, grill plate, griddle plate, pancake plate, waffle plate, pizzelle plate, saute plate, steam plate, crisper plate and warming plate.

Another aspect of a preferred embodiment of the invention is a digital read-out which may provide information such as cooking time, top heating section heat intensity and bottom heating section heat intensity. The digital read-out may have further functions such as pre-programmed cooking techniques and automatic settings for cooking time and top and bottom heating section heat intensities.

Moreover, the electric grill may preferably have a keypad which includes buttons to start and stop cooking, adjust the heat intensity of the top heating section, adjust the heat intensity of the bottom heating section and adjust cooking time.

Furthermore, the electric grill may preferably include a drip tray, heat shield, splatter guard and a cross member. The cross member is located on the base of the grill and provides additional stability.

Electric grills may also include magnetic material to pull the top heating section and bottom heating section against each other.

DETAILED DESCRIPTION OF THE PREFERRED EMBODIMENT

In the following are described embodiments of the electric grill in accordance with certain aspects of the present invention. In describing the embodiments illustrated in the drawings, specific terminology will be used for the sake of clarity. However, the invention is not intended to be limited to the specific term so selected, and it is to be understood that each specific term includes all technical equivalents that operate in a similar manner to accomplish a similar purpose.

Figure 1:
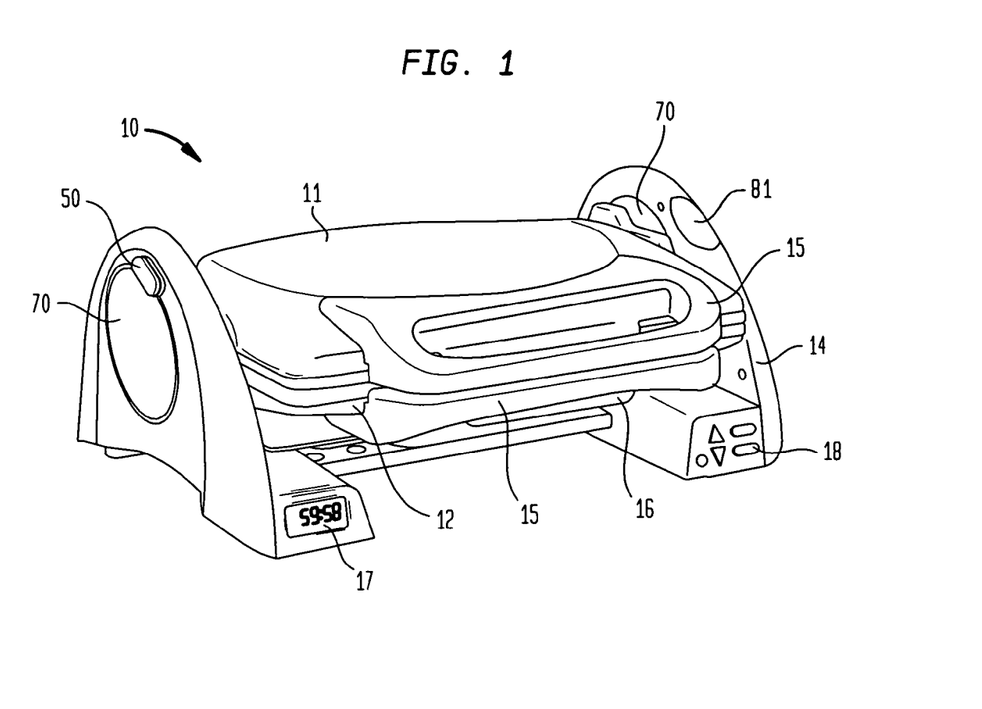
FIG. 1 is a perspective view of an electric grill in accordance with one aspect of the present invention.
Figure 3:
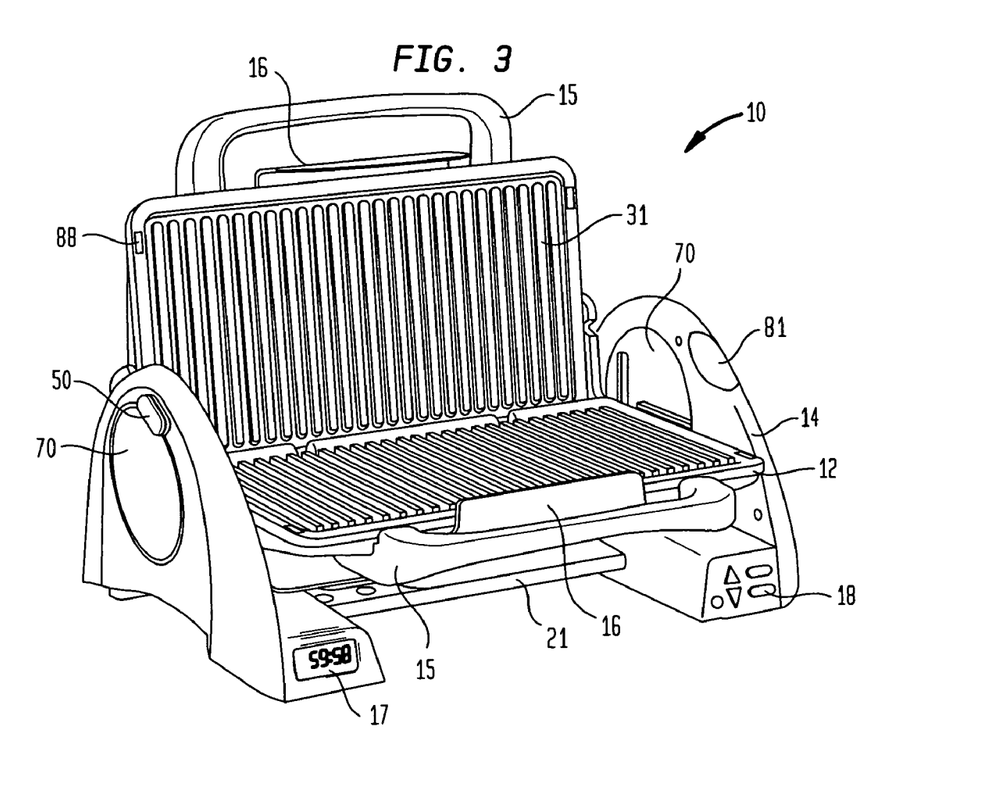
FIG. 3 is a perspective view of the electric grill of FIG. 1 with the top heating surface in an open position perpendicular to the bottom heating surface.

Referring to the figures, FIG. 1 depicts a perspective view of an electric grill in accordance with the preferred embodiment of the present invention. As shown, the electric grill 10 has a top heating section 11 and a bottom heating section 12 attached to a support structure 14 by two hinges 70. The hinges 70 attach to the rear portion of both the top and bottom heating sections 11 and 12 which allows the top heating section 11 to pivot on its rear side such that the top heating section 11 lifts up from the bottom heating section 12 to a position roughly perpendicular to the bottom heating section 12, as shown in FIG. 3. The top and bottom heating sections 11 and 12 each have a handle 15 on the front side to ease in handling by the user. The handles 15 may be removable. Moreover, both top and bottom heating sections 11 and 12 include a splatter guard 16 on the front side to protect the user from hot grease, oils and juices which are released from the food during cooking. The support structure 14 preferably includes a digital read-out 17 and a user input keypad 18.

Figure 2:
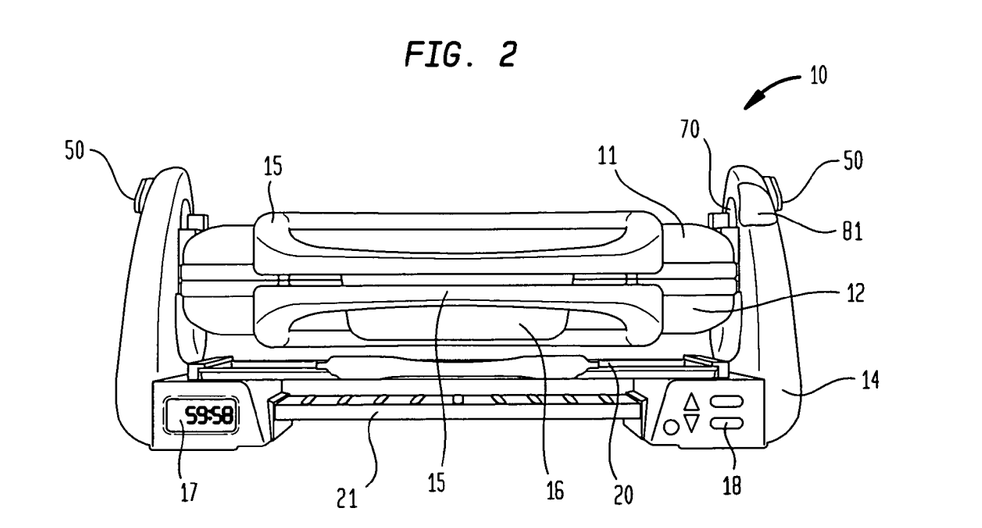
FIG. 2 is an elevation view of the front of the electric grill of FIG. 1.

Furthermore, as seen in FIG. 2, the preferred embodiment of this invention includes a removable drip tray 20 which is located above a mid-beam 21 which offers additional support and stability to the support structure 14. The drip tray 20 collects excess grease, oils, and juices which flow from the food down the rear of the bottom heating section 12. The excess liquids then flow off the rear of the bottom heating section 12 and fall into the drip tray 20. The drip tray 20 is removable for ease of cleaning and is washable.

The electric grill 10 may be constructed from a variety of materials. Preferably, the electric grill will be constructed of plastic suitable to withstand the temperatures reached in and around an oven or grill. Other materials such as various metals and other composites may also be utilized. For example, a partial stainless steel exterior may be desirable to match the motif of a kitchen and the appliances therein. Also, the top and bottom heating sections 11 and 12 are preferably constructed of steel, and more preferably stainless steel. It is preferable that as much of the electric grill 10 should be made of plastic as possible as it is a benefit of the electric grill 10 of this invention that it remain light-weight and thus easily positioned and used on a solid surface, such as a counter-top or table. After use, the light-weight and compact structure allows the electric grill 10 to be easily stored in a cabinet or the like.

Attached to each of the top and bottom heating sections 11 and 12 is a cooking surface 31, which may be seen in FIG. 3. The cooking surface 31 is the surface on which the food is placed to cook. The cooking surfaces 31 are preferably constructed of material suitable and well known in the art for cooking food, such as steel, aluminum or other suitable materials. The cooking surface 31 may be clad with a non-stick coating, such as Teflon®, to ease the cooking and cleaning process. Moreover, the heating plates 31 should be removable, washable and replaceable. It is intended that the electric grill 10 would include a variety of cooking surfaces 31 suitable for various types of cooking procedures. The variety of cooking surfaces 31 include, but are not limited to, grill surfaces, griddle surfaces, pancake surfaces, waffle surfaces, pizzelle surfaces, saute surfaces, steam surfaces, crisper surfaces, and warming surfaces.

Figure 7:
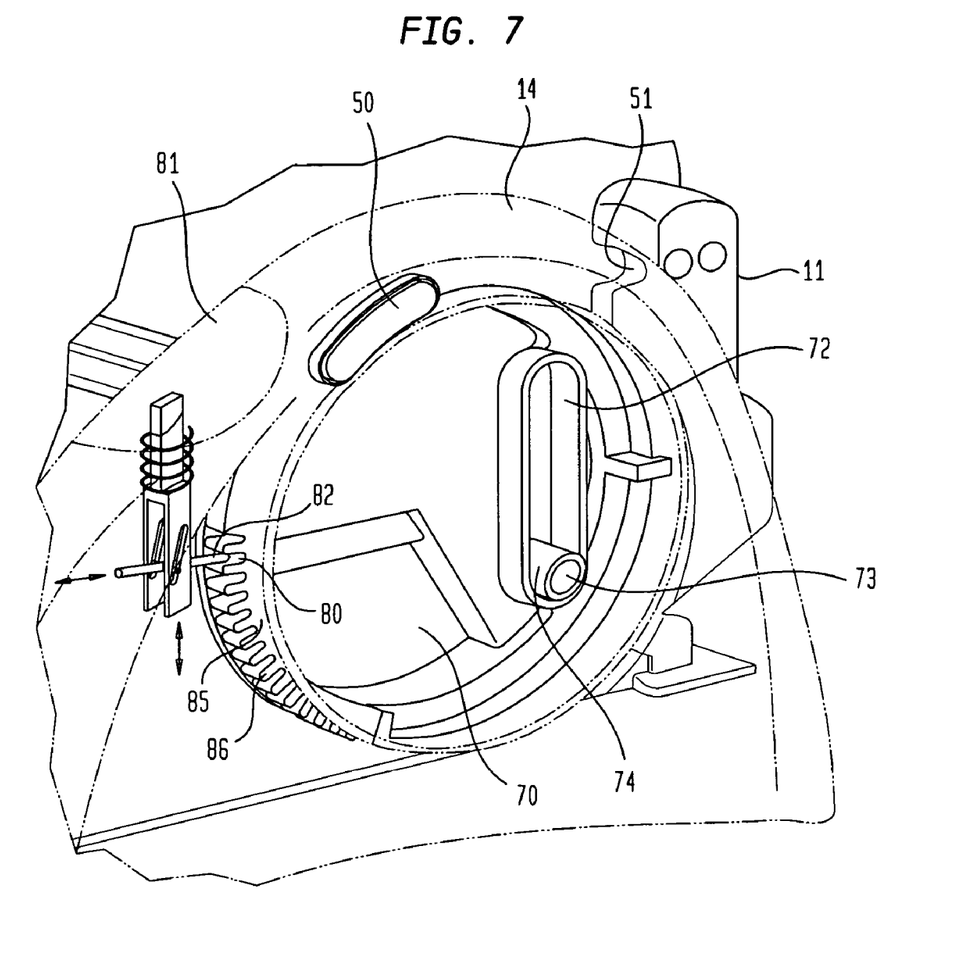

FIG. 3 shows how the hinge 70 preferably connects the top and bottom heating sections 11 and 12 to each other such that they can interact with one another. The hinge 70 is preferably constructed in a circular design. This circular design allows the hinge 70 to smoothly interact with the unique tilt mechanism 80, which is shown in FIG. 7 and will be discussed below. The bottom heating section 12 is affixed to the hinge 70 such that the bottom heating section 12 remains stationary. Again, as will be discussed below, this design allows the hinge 70 to smoothly interact with the tilt mechanism 80. The hinge 70 does not allow movement in the bottom heating section 12. But, when the hinge 70 is moved using the tilt mechanism 80, the bottom heating section 12 moves directly in sync with the hinge 70 and tilt mechanism 80 since they are all connected to each other to form one coherent and rigid structure.

As shown in FIG. 7, the top heating section 11 preferably has a peg 73 which extends from each rear corner. Each peg 73 inserts into each channel 72 on each hinge 70. The peg 73 is free to navigate up and down through the channel 72. For the sake of clarity, this peg-channel combination will be hereinafter referred to as a "floating hinge" 74.

The floating hinge 74 gives the top heating section 11 ample flexibility and movement in which to conduct various cooking operations. Moreover, the floating hinge design 74 of the present invention is simpler than those known in the art since the floating hinge 74 does not include extraneous parts, such as a spring or the like. The floating hinge 74, or at least the housing thereof, is preferably built of a plastic suitable to withstand the heat of a grill or oven.

The floating hinge design 74 of the present invention allows the top heating section 11 to operate in three distinct positions. First, as seen in FIG. 1, the top heating section 11 may be in a closed position such that it is face-to-face with the bottom heating section 12. This configuration results in a faster cooking time since food is cooked on two sides at once. Moreover, if the food is particularly large, the floating hinge 74 allows the rear end of the top heating section 11 to elevate, thus increasing the space between the rear portions of the top and bottom heating sections 11 and 12. The floating hinge allows the top heating section to elevate, in the preferred embodiment, to about 3-inches above the bottom heating section. As a result, the top heating section can remain parallel to the bottom heating section 12, even when larger sized food is cooked, and allow for even cooking over the entire surface of the food.

If the food being cooked is particularly small, the top heating section 11 may interact directly with the bottom heating section and "seal" the food in between the top and bottom heating sections 11 and 12. This is anticipated to be particularly useful, for example, when using a sauteing surface. The bottom heating section 12 has a sauteing surface affixed to it, and the top heating section is brought down to this first position to "seal" the sauteing food between the bottom heating section saute surface and the top heating section 11. This traps in the heat and allows for faster sauteing of the food. Furthermore, the "seal" can also operate as a pressure cooker for use in certain cooking functions in which pressure cooking is desired. It is envisioned that a clamp or spring could be added to the top and bottom heating sections 11 and 12 to increase the pressure cooker capabilities by locking the top and bottom heating sections 11 and 12 together when in this position.

The second position, embodied in FIG. 3, is where the top heating section 11 is preferably roughly perpendicular to the bottom heating section 12. The top heating section 11 comes to rest at a preferably roughly perpendicular position and remains there without requiring support from the user. The top heating section 11 rests on the support structure 14. This is particularly useful when positioning food on the bottom heating section 12. Moreover, this position may be used when the user desires to only cook one side of the food at a time. As will be discussed in greater detail below, the user input keypad 18 allows the top heating section 11 to be turned completely off when the top heating section 11 is in this position, such that it is not hot and is not using electricity.

Figure 4:
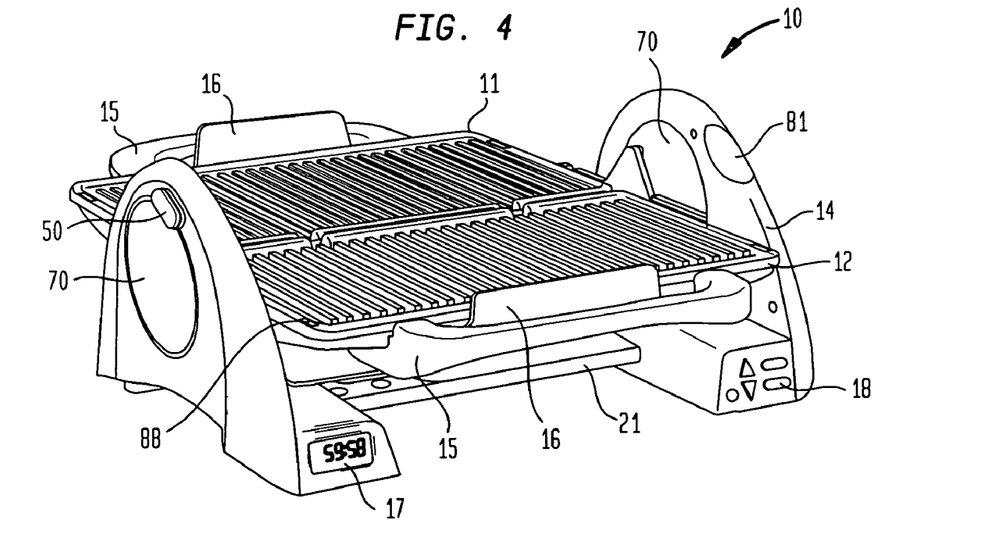
FIG. 4 is a perspective view of the electric grill of FIG. 1 with the top heating surface at a 180-degree angle to the bottom heating surface.

In a third possible position, illustrated in FIG. 4, the top heating section 11 may continue to be lifted towards the back of the electric grill 10 to a position about 180-degrees in relation to the bottom heating section 12. This is anticipated to be attained by positioning the top heating section 11 at a roughly perpendicular position, similar to the second position discussed above. Then, the top heating section 11 may be lifted such that the peg 73 travels up the channel 72 of the floating hinge 74. This action lifts the top heating section 11 from its resting point on the support structure 14. The top heating section 11 may then continue to be pushed towards the back of the electric grill 10 until it lays flat on the same plane as the bottom heating section 12. Just as in the other two positions, the top and bottom heating sections heat intensities may be adjusted separately while in this third position.

This creates two cooking surfaces—the top cooking surface 31 and the bottom cooking surface 31—on which food may be placed. The two cooking surfaces may cook the same food or different foods. The cooking surfaces 31 may be the same or may be different in order to accommodate different foods or cooking activities. For example, the bottom heating section 12 may have a grill surface for cooking chicken, while the top heating section 11 has a saute surface for sauteing vegetables. It should be noted that, additionally, while in the 180 degree open position, the top and bottom heating sections 11 and 12 can both be tilted to allow the separation of the excess grease, oils and juices from the food being cooked. Therefore, the 180 degree open position can become a, for example, 170 degree or 160 degree open position which allows the excess grease, oils and juices to separate from the food being cooked and collect in the drip tray 20.

Thus the top and bottom heating sections 11 and 12 may be utilized, when in the 180 degree open position, to cook the same food on both sections 11 and 12. Alternatively, the top and bottom heating sections 11 and 12 may be utilized, in this open position, to cook different types of foods, on different cooking surfaces 31 and at different heat intensities, as adjusted using the keypad 18 and as displayed on the digital read-out 17.

Figure 5:
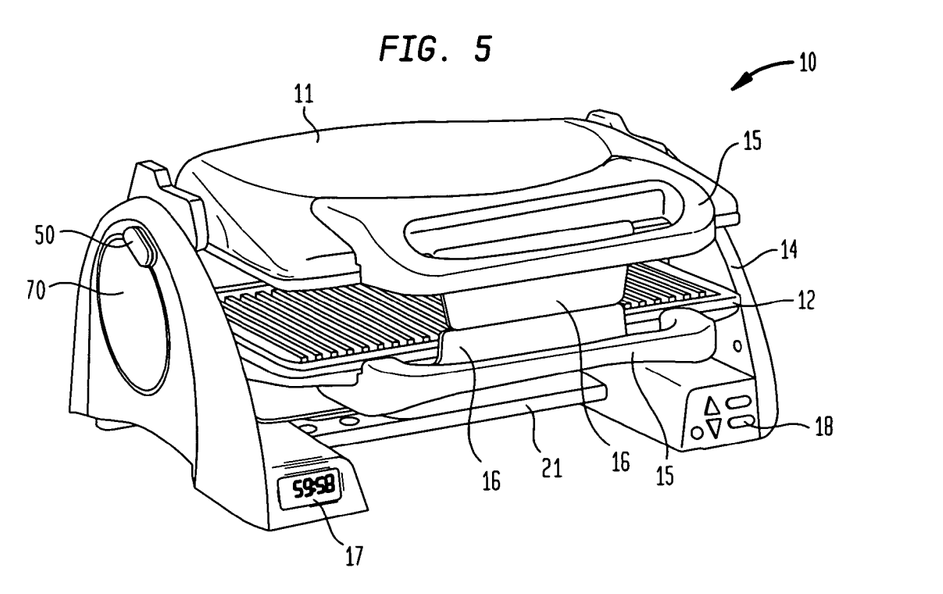
FIG. 5 is a perspective view of the electric grill of FIG. 1 showing the top heating surface interacting with the extendable tabs.

FIG. 5 illustrates a further position available for of the electric grill 10. In this position, the top heating section 11, positioned in the first, or closed, position is lifted to the maximum height of the floating hinge 74 which may be around 3 inches. The tabs 50 are then extended from the support structure 14 by pressing the end of the tabs located on the external side of the support structure 14. The tabs 50 are spring-loaded such that when pressed once, the tabs 50 extend toward the center of the electric grill 10. When pressed again, the tabs 50 retract back into the support structure 14. Each tab 50 extends far enough into the middle of the electric grill 10 such that grooves 51 associated with the top heating section 11 may interact with each of them. The grooves 51 in the top heating section 11 are preferably located on each side to interact with the tabs 50 to lock the top heating section 11 in place. The tabs 50 also position the top heating section 11 roughly 3 inches above and parallel to the bottom heating section 12. It is anticipated that a series of tabs 50 at different elevations could be incorporated to allow a variety of levels on which the top heating section 11 may rest. For example, sets of tabs 50 may be added to the support structure 14 at 3-inches, 2½ inches; 2-inches and so on to allow for greater flexibility in cooking. This creates a broil effect with the top heating section 11 hovering over the food product which may be used to broil food. As. will be discussed below, the user input keypad 18 may be used to increase the heat intensity of the top heating section 11 and lower the heat intensity of the bottom heating section 12 to create the proper broiling effect.

Figure 6:
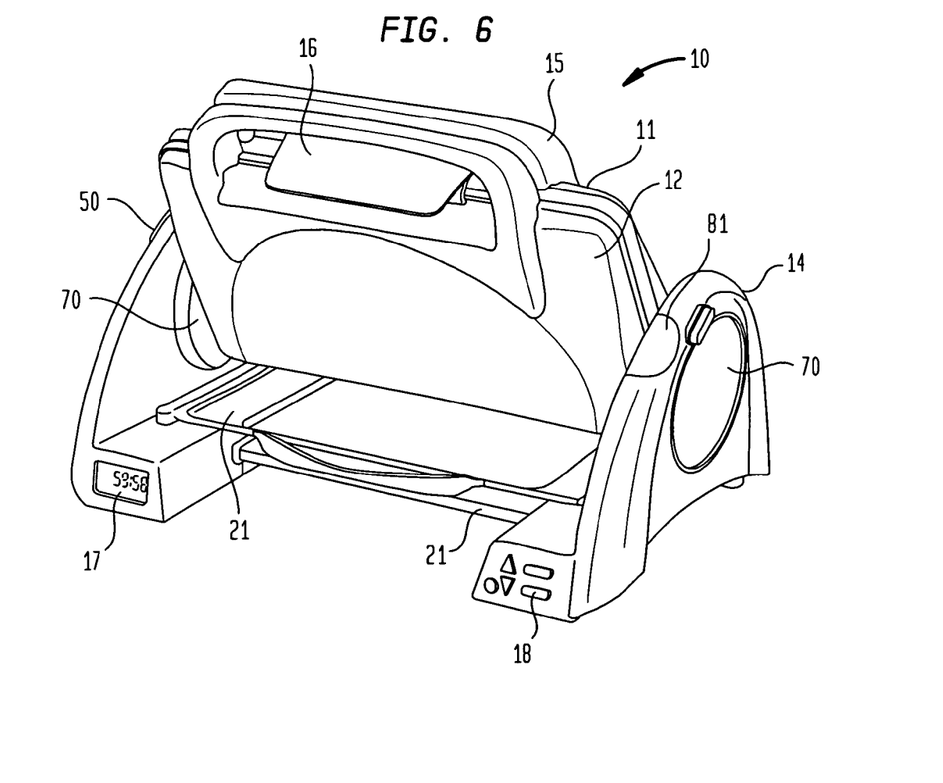
FIG. 6 is a perspective view of the electric grill of FIG. 1 utilizing the tilting mechanism; and, FIG. 7 illustrates a cross section of the support structure, hinge component and tilting mechanism of the electric grill of FIG. 1.

FIG. 6 illustrates still a further position available for the electric grill 10 of the present invention where top and bottom heating sections 11 and 12 may be adjustably tilted such that excess grease, oils and juices may separate from the food being cooked. The steeper the tilted angle, the more grease, oils and juices are drained from the food. Thus, by varying the angle of tilt, the user can determine the degree of grease, oils and juices the user wishes to drain from the food. Moreover, making the angle of tilt the maximum, about 60 degrees, creates a barbeque affect in that it allows as much of the excess grease, oils and juices to separate from the food as possible. This results in a grill which cooks food to be as healthy as the user wishes it to be, and, for example, to balance the flavor and the juiciness of meat with its lower fat and cholesterol content.

The user may adjust the angle of tilt of the top and bottom heating sections 11 and 12, preferably, by holding onto the two handles 15 and pressing and holding the button 81 provided on the support structure 14. By holding the button 81, the top and bottom heating sections 11 and 12 pivot freely at the hinge 70 since the button 81 unlocks the hinge 70 and allows the hinge 70 to pivot around the center of its circular shape. Once the desired angle of tilt is obtained, the user may release the button 81 and the tilt mechanism 80 locks the hinge 70 in place.

As seen in FIG. 7, the tilting mechanism 80 may include a gear-toothed wheel 85 fixedly attached to the hinge 70. The wheel 85 may have a number of teeth 86, and preferably about 16 teeth, evenly spaced along the front side of the wheel. These teeth 86, as shown, may span approximately 30-degrees along the wheel 85, providing for approximately 30-degrees of tilt in stepped increments. The tilting mechanism 80 locks the hinge 70 in place through the use of a rod 82 which interacts with the gear-toothed wheel 85. The rod 82 is fixedly attached to the button 81 such that when the user presses the button 81, the rod 82 disengages the teeth 86 on the wheel 85. When the button 81 is released, the rod 82 reengages the wheel 85 in between two teeth 86 and once again locks the hinge 70 in place. While the gear-toothed wheel/rod combination is a preferred embodiment, the tilting mechanism 80 is not limited to such design. It is equally possible to create a tilting mechanism using an electronic servo, a ratchet system or a friction system. The tilt mechanism 80 could tilt the grill in discrete positions, as with a gear wheel 85, or could be such that the degree of tilt is infinitely variable, as with a servo motor or friction system.

In the various Figures of the exemplary grill 10, there are also shown a series of magnets 88 in the interior corners of each of the top heating section 11 and bottom heating section 12. Although the magnets 88 are shown in the corners, it will be appreciated that the magnets may be located at a variety of positions. In any event, the magnets 88 function to assist with closure of the top heating section 11 against the bottom heating section 12. For example, it will be appreciated that when two pieces of food items with different heights are placed on the lower cooking surface 31 and the top heating section 11 is closed against the bottom heating section 11, it may be possible that the shorter of the two food items may not be squeezed by the two cooking surfaces 31. The magnets 88 assist with pulling the two cooking surfaces 31 together, to assist with avoiding this problem. It will be appreciated that the magnets may be of varying degrees of strength, such that they are preferably strong enough to pull the components together, but not so strong as to inhibit a user's ability to open the electric grill 10. Additionally, the magnets may be removable so that they can be temporarily removed, if so desirable.

As seen in FIGS. 1-6, the preferred embodiment of the electric grill 10 of this invention includes a digital read-out 17 and user input keypad 18. The digital read-out may display cooking time, top heating section heat intensity and bottom heating section heat intensity. The cooking time may be displayed in double digit minutes and double digit seconds, while the heat intensities of the top and bottom heating sections are preferably displayed by a series of bars whereby a higher heat intensity is signified by a higher number of bars and a lower heat intensity is signified by a lower number of bars. If there are no bars next to the specified heating section, then that heating section is not producing heat. The top heating section heat intensity reading is across the top of the readout, while the bottom heating section heat intensity reading is along the bottom of the readout. of course, any suitable heat read-out is contemplated.

Moreover, it is anticipated that the present invention allows for future upgrades such as pre-programmed modules or updates which may include pre-selected settings or cooking programs. For example, one of these pre-programmed updates can have a pre-programmed specific cooking set-up for cooking steak. By selecting the "steak" program, the cooking time and top and bottom heating sections heat intensities may be automatically set to properly cook steak in accordance with the pre-programmed module. The invention may be incorporated with a multitude of such pre-programmed modules for a variety of foods such as, but not limited to, chicken, fish, vegetables, pancakes, waffles, hamburgers, and steaks.

The user input keypad 18 provides an interface between the user and the electric grill 10. The user may input a desired grilling time and top and bottom heating section heat intensity. The cooking time may be inputted by adjusting the desired minutes and seconds for cooking, at the conclusion of which an alarm may sound. The top and bottom heating section heat intensities may be adjusted individually to be different or the same. For example, the user may simply adjust the number of bars next to "top" and "bottom" to acquire the desired heat intensity of each heating section.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An electric grill, comprising:
   a support structure;
   a top heating section having a top cooking surface and a bottom heating section having a bottom cooking surface, said sections being connected to the support structure and at least one section being pivotally associated with the support structure to move between a closed position at which the cooking surfaces are facing one another and an open position at which the surfaces are at an angle to one another that is approximately 180 degrees; and said support structure including a tilting mechanism, said tilting mechanism supporting and retaining said sections in a plurality of angular positions, one of said plurality being between 0 and 90 degrees.

2. The electric grill of claim 1, wherein the tilting mechanism comprises a gear allowing releasable fixation of the top and bottom heating sections at a number of discrete angular positions.

3. The electric grill of claim 2, wherein the tilting mechanism is a gear-tooth wheel in conjunction with a rod, which fits within two teeth of the gear, such that when the rod engages the wheel the top and bottom heating surfaces are locked in place and when the rod is disengaged the combination of the top and bottom heating surfaces can move freely.

4. The electric grill of claim 3, wherein the rod engages and disengages the wheel by a push button.

5. The electric grill of claim 1, wherein the tilting mechanism allows for infinitely adjustable releasable fixation of the top and bottom sections.

6. The electric grill of claim 1, wherein the tilting mechanism allows for angular positioning at discrete positions between 0 and 60 degrees.

7. The electric grill of claim 1, wherein the sections can be maintained separate from one another at a distance such that food on the bottom cooking surface is not touched by the top cooking surface, or can be permitted to close towards each other so that food on the bottom cooking surface is touched by the top cooking surface.

8. The electric grill of claim 1, wherein the sections are hinged together by at least one hinge.

9. The electric grill of claim 1, wherein the sections are hinged together by two hinges separated from one another which allows for grease, oils and juices from the food being cooked to drip off of the bottom heating section from between the two hinges.

10. The electric grill of claim 8 or 9, wherein the tilting mechanism and the hinge together attach to the top and bottom heating sections at the same point.

11. The electric grill of claims 8 or 9, wherein the at least one hinge allows the top heating section to separate from the bottom heating section to a distance of up to 3 inches while still in a closed position.

12. The electric grill of claim 11, further comprising tabs positioned on two sides of the top heating surface adjacent to the hinges wherein the tabs can be extended to interact with the top heating section and can hold the top heating section in place at a height of about 3 inches above and parallel to the bottom heating section.

13. The electric grill of claim 1, further comprising a digital read-out comprising a digital display for cooking time, top heating section heat intensity and bottom heating section heat intensity.

14. The electric grill of claim 1, further comprising a user input keypad comprising buttons to start and stop heating of the top and bottom heating sections, adjust the heat intensity of the top heating section, adjust the heat intensity of the bottom heating section and adjust the cooking time.

15. The electric grill of claim 1, further comprising a variety of removable top and bottom cooking surfaces on which food directly touches and cooks.

16. The electric grill of claim 15, wherein the cooking surfaces are washable and replaceable.

17. The electric grill of claim 15, wherein the top and bottom cooking surfaces comprise grill surface, griddle surface, pancake surface, waffle surface, pizzelle surface, sauté surface, steam surface, food warming surface and crisping surface.

18. The electric grill of claim 14, wherein the top cooking surface and bottom cooking surface are the same type of cooking surface.

19. The electric grill of claim 14, wherein the top cooking surface and bottom cooking surface are different types of cooking surfaces.

20. The electric grill of claim 1, further comprising a removable drip tray.

21. The electric grill of claim 1, further comprising a splatter guard.

22. The electric grill of claim 1, further comprising a base plate for additional support of the grill.

23. The electric grill of claim 19, wherein the digital read-out, user input keypad, tilting mechanism and tabs are all positioned on the support structure.

24. A method of using an electric grill, comprising:
raising a top heating section to a position approximately 90 degrees to a bottom heating section;
placing food on the bottom heating section;
lowering the top heating section such that the top heating section is parallel to the bottom heating section;
adjusting the height of the top heating section a desired distance from the bottom heating section;
tilting and retaining the top and bottom heating sections at a discrete angular position other than 0, 90 or 180 degrees, such that grease, oils and juices may be separated from the food being cooked.

25. A method of using an electric grill, comprising:
raising a top heating section to a position approximately 90 degrees to a bottom heating section;
placing food on the bottom heating section;
raising heat intensity of the top heating section;
lowering heat intensity of the bottom heating section;
extending at least one set of tabs such that the tabs may interact with the top heating section;
lowering the top heating section such that it rests on the tabs and remains parallel to the bottom heating section;
tilting and retaining the top heating section and bottom heating section at an angle between 0 and 90 degrees.

26. An electric grill, comprising:
a support structure;
a top heating section having a top cooking surface and a bottom heating section having a bottom cooking surface, said sections being connected to the support structure and at least one section being pivotally associated with the support structure to move between a closed position at which the cooking surfaces are facing one another and an open position at which the surfaces are at an angle to one another that is approximately 180 degrees; and
said support structure including a tilting mechanism, said tilting mechanism supporting said sections in a plurality of angular positions;
wherein the tilting mechanism comprises a gear allowing releasable fixation of the top and bottom heating sections at a number of discrete angular positions;
wherein the tilting mechanism is a gear-tooth wheel in conjunction with a rod, which fits within two teeth of the gear, such that when the rod engages the wheel the top and bottom heating surfaces are locked in place and when the rod is disengaged the combination of the top and bottom heating surfaces can move freely.

27. The electric grill of claim 26, wherein the rod engages and disengages the wheel by a push button.

28. An electric grill, comprising:
a support structure;
a top heating section having a top cooking surface and a bottom heating section having a bottom cooking surface, said sections being connected to the support structure and at least one section being pivotally associated with the support structure to move between a closed position at which the cooking surfaces are facing one another and an open position at which the surfaces are at an angle to one another that is approximately 180 degrees; and
said support structure including a tilting mechanism, said tilting mechanism supporting said sections in a plurality of angular positions;
wherein the sections are hinged together by at least one hinge,
wherein the tilting mechanism and the hinge together attach to the top and bottom heating sections at the same point,
wherein the at least one hinge allows the top heating section to separate from the bottom heating section to a distance of up to 3 inches while still in a closed position;
the electric grill further comprising tabs positioned on two sides of the top heating surface adjacent to the hinges wherein the tabs can be extended to interact with the top heating section and can hold the top heating section in place at a height of about 3 inches above and parallel to the bottom heating section.

29. An electric grill, comprising:
a support structure;
a top heating section having a top cooking surface and a bottom heating section having a bottom cooking surface, said sections being connected to the support structure and at least one section being pivotally associated with the support structure to move between a closed position at which the cooking surfaces are facing one another and an open position at which the surfaces are at an angle to one another that is approximately 180 degrees;
said support structure including a tilting mechanism, said tilting mechanism supporting and retaining said sections in a plurality of angular positions, one of said plurality being between 0 and 90 degrees;
wherein the tilting mechanism comprises a gear allowing releasable fixation of the top and bottom heating sections at a number of discrete angular positions;
wherein the tilting mechanism is a gear-tooth wheel in conjunction with a rod, which fits within two teeth of the gear, such that when the rod engages the wheel the top and bottom heating surfaces are locked in place and when the rod is disengaged the combination of the top and bottom heating surfaces can move freely.

30. The electric grill of claim 29, wherein the rod engages and disengages the wheel by a push button.

31. An electric grill, comprising:
a support structure;
a top heating section having a top cooking surface and a bottom heating section having a bottom cooking surface, said sections being connected to the support structure and at least one section being pivotally associated with the support structure to move between a closed position at which the cooking surfaces are facing one another and an open position at which the surfaces are at an angle to one another that is approximately 180 degrees;
said support structure including a tilting mechanism, said tilting mechanism supporting and retaining said sections in a plurality of angular positions, one of said plurality being between 0 and 90 degrees;
wherein the sections are hinged together by at least one hinge;
wherein the tilting mechanism and the hinge together attach to the top and bottom heating sections at the same point;
wherein the at least one hinge allows the top heating section to separate from the bottom heating section to a distance of up to 3 inches while still in a closed position;
the electric grill further comprising tabs positioned on two sides of the top heating surface adjacent to the hinges wherein the tabs can be extended to interact with the top heating section and can hold the top heating section in place at a height of about 3 inches above and parallel to the bottom heating section.

32. An electric grill, comprising:
a support structure;
a top heating section having a top cooking surface and a bottom heating section having a bottom cooking surface, said sections being connected to the support structure and at least one section being pivotally associated with the support structure to move between a closed position at which the cooking surfaces are facing one another and an open position at which the surfaces are at an angle to one another that is approximately 180 degrees;
said support structure including a tilting mechanism, said tilting mechanism supporting and retaining said sections in a plurality of angular positions, one of said plurality being between 0 and 90 degrees;
wherein the sections are hinged together by two hinges separated from one another which allows for grease, oils and juices from the food being cooked to drip off of the bottom heating section from between the two hinges;
wherein the tilting mechanism and the hinge together attach to the top and bottom heating sections at the same point;
wherein the at least one hinge allows the top heating section to separate from the bottom heating section to a distance of up to 3 inches while still in a closed position;
the electric grill further comprising tabs positioned on two sides of the top heating surface adjacent to the hinges wherein the tabs can be extended to interact with the top heating section and can hold the top heating section in place at a height of about 3 inches above and parallel to the bottom heating section.

* * * * *